United States Patent

Germain et al.

[15] 3,675,518
[45] July 11, 1972

[54] STOPPER RENEWAL DEVICE

[72] Inventors: Andrew G. Germain, Medina; William G. Dressel, Elk Grove Village, both of Ill.

[73] Assignee: Amsted Industries Incorporated, Chicago, Ill.

[22] Filed: Aug. 10, 1970

[21] Appl. No.: 62,361

[52] U.S. Cl. ..........................................82/1 B, 408/112
[51] Int. Cl. .................................................B23b 3/06
[58] Field of Search ..............82/1 B, 1 A, 4 C; 408/112

[56] References Cited

UNITED STATES PATENTS

| | | | |
|---|---|---|---|
| 1,941,551 | 1/1934 | Gjersten | 408/112 X |
| 1,365,660 | 1/1921 | Collier | 408/112 X |
| 520,273 | 5/1894 | Schwickart | 408/112 X |
| 49,203 | 8/1965 | Wing | 82/1 B |

*Primary Examiner*—Leonidas Vlachos
*Attorney*—Walter L. Schlegel, Jr. and Russell W. Pyle

[57] ABSTRACT

A base supports the underside of the stopper, and the cutter is rotatably mounted on a shaft having a head to clamp the stopper against the base during the cutting operation.

5 Claims, 1 Drawing Figure

PATENTED JUL 11 1972 3,675,518
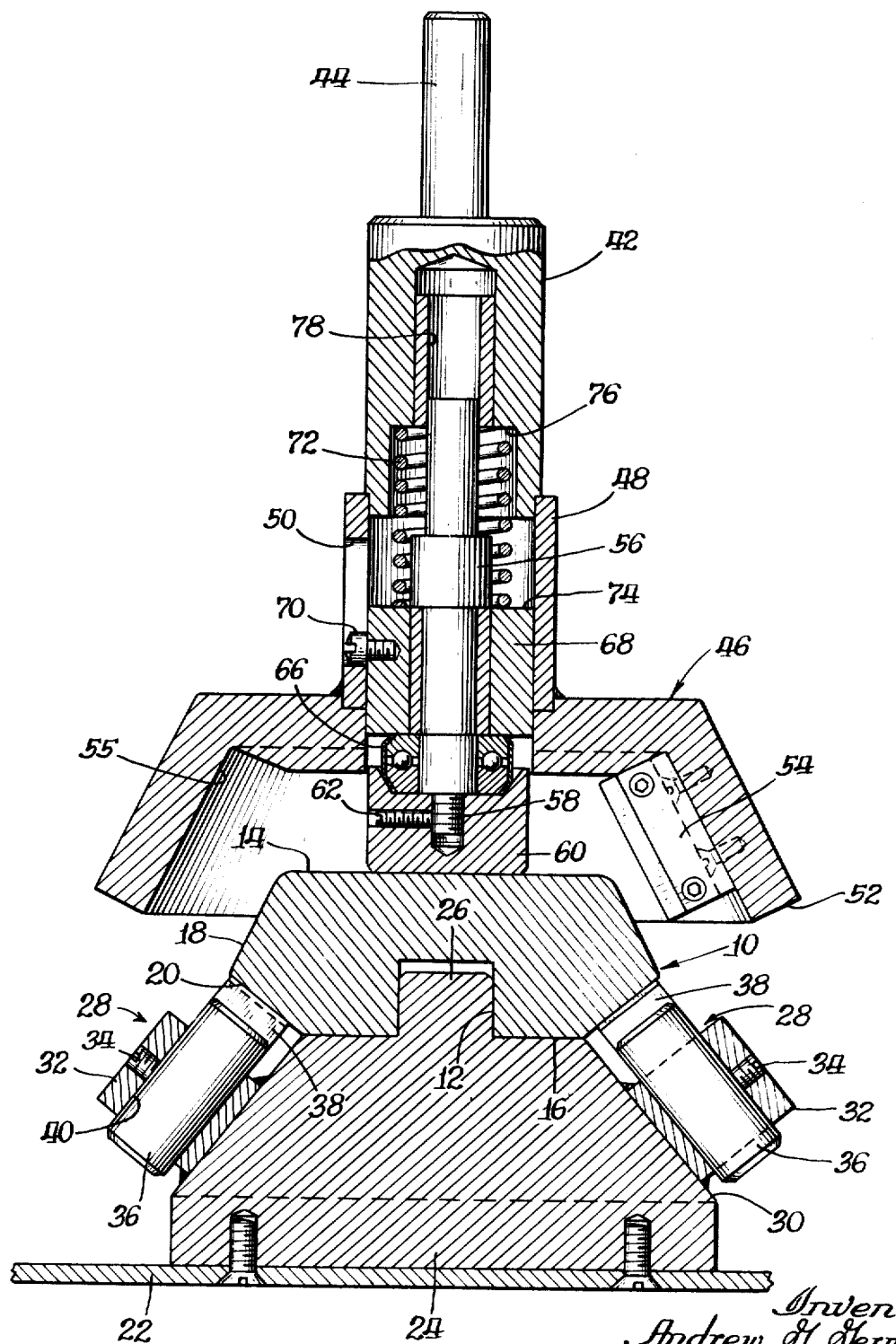
Inventors
Andrew J. Germain
William J. Dressel
By Russell W. Pyle
Walter F. Schlegel Jr. Attys

STOPPER RENEWAL DEVICE

The present invention relates to machining devices and more particularly to a device for holding a piece while cutting or finishing an angular surface thereon. The invention has particular applicability to the cleaning or refinishing of the frusto-conical surfaces of mold stoppers.

In Strom, U.S. Pat. No. 2,838,816 and Drever, U.S. Pat. No. 3,011,231, incorporated herein by reference, a mold is described which utilizes a refractory or graphite stopper having a tapered surface for sealing the ingate of the mold after the mold has been filled. In order to use the stopper in successive casting operations, however, it is necessary to clean or renew the tapered surface thereof in order that a good seal will be achieved between the stopper and the ingate.

Accordingly, an object of this invention is to provide a device that will quickly clean or renew the aforesaid type of stopper.

Other objects will become apparent from the following description and appended claims, taken in connection with the accompanying drawing wherein the inventive device is shown in vertical cross section.

With more particular reference to the drawing, a device is disclosed for cleaning a tapered surface of a refractory or graphite stopper 10. When used in a mold, the stopper is inverted from the position shown and is suspended within the mold cavity by means of a rod (not shown) inserted in a bore 12 in the stopper. As shown, the stopper comprises a body having spaced parallel planar surfaces 14 and 16 interconnected by merging side frusto-conical surfaces 18 and 20, the surface 18 being that which seals against the ingate of the mold.

The cleaning device comprises a stationary base 22 having a holding block 24 secured thereto for supporting the stopper 10 during the cleaning operation. A cylindrical part 26 extends from the top of the block 24 to be received by the stopper bore 12. A plurality of adjustable supports, generally indicated at 28 are mounted on a outwardly diverging frusto-conical surface 30 of the block 24, each support comprising a sleeve 32 having a set screw 34, said sleeve being secured on the frusto-conical surface, and a rod 36 having a holding blade 38 secured at one end thereof, said rod being slidably adjustable in the bore 40 of the sleeve. The adjustable supports 28, preferably four in number, are spaced equidistantly from one another and prevent rotation of the stopper during the cleaning operation.

The cutting portion of the device comprises a shank 42 having an upper end 44 adapted for receipt within the chuck of a drill press (not shown) or other device for imparting rotary as well as downward motion to the shank. A cutter holder 46 is secured to the shank by means of an axially aligned cylindrical sleeve 48 having a vertically elongated slot 50 therein. The cutter holder 46 is generally round in shape and comprises an outwardly diverging flange 52, with a plurality of cutters 54 secured on the internal diverging surface 55 of said flange. A cylindrical shaft 56 is mounted within the shank 42 and sleeve 48, the lower end 58 of said shaft being threadably engaged with a cylindrical pressure head 60 engageable with a planar surface 14 of the stopper. The pressure head 60 includes a set screw 62 abutting the threaded end 58 of the shaft to prevent accidental release therefrom. A depression 64 in the upper surface of the head 60 supports the lower portion of a thrust bearing 66 mounted on the shaft 56. A cylindrical member 68 journaled on the shaft 56 is supported on the upper portion of the thrust bearing 66 and includes a round head screw 70 in the side thereof, the head of said screw riding in the aforementioned vertical slot 50 in the sleeve 48. A helical spring 72 is disposed around the shaft 56 extends between the upper surface 74 of the member 68 and an internal abutment 76 of the shank 42. The upper end of the shaft 56 is journaled in an internal bearing surface 78 of the shank 42.

In operation, the axis of the shank 42 is brought into alignment with the axis of the holding block, and the shank is rotated and lowered, causing the pressure head 60 to be firmly pressed against the stopper 10, thereby holding the stopper firmly on its underlying support. At the same time, the blades 54 of the rotating cutter holder 46 are brought into contact with the exposed frusto-conical surface 18 of the stopper, and it will be noted that the blades are disposed on an angle that may be desired in the surface 18 of the stopper. It will be noted that the shaft 56 and pressure head 60 remain stationary relative to the other rotating elements of the cutting portion by virtue of the thrust bearing 66. Contact of the shaft 56 with the bearing surface 78 of the shank 42 and the cylindrical part 68, and abutment of the shaft-connected pressure head 60 with the stopper 10 serve to maintain the cutters 54 in proper orientation with the surface 18 of the stopper being cleaned. The screw 70 limits vertical travel of the shank 42 by abutment of said screw with the ends of the slot 50.

Having thus described the invention, what is claimed is:

1. a device for renewing a stopper having a frusto-conical surface, comprising base means for supporting the underside of said stopper, said base means including a plurality of angularly disposed blade means for preventing rotation of said stopper, spring loaded means for clamping the stopper against said support, cutter means journaled on the spring loaded means and rotatable relative thereto, said cutter means including a plurality of spaced blades disposed on angle relative to the rotational axis of said cutter means.

2. The device of claim 1 wherein the spring loaded means for clamping the stopper against the support comprises a shaft, a head secured at one end of the shaft and abuttable with the stopper, and helical spring means for urging the head against the stopper as the cutter means is moved toward the stopper.

3. The device of claim 2 wherein the cutter comprises cylindrical parts rotatably mounted on said shaft, a cutter holder rotatable with said parts, an outwardly diverging flange on said cutter holder, and a plurality of cutters secured to said flange.

4. The device of claim 1 wherein the blade means comprises a sleeve and rod having a holding blade secured at one end and being adjustable in said sleeve.

5. The device of claim 1 wherein said base means include a holding block defining a protrusion, and said stopper defines a bore, said protrusion being received by said bore.

* * * * *